(No Model.)
H. SCHMIDT.
ENGRAVER'S VISE.
No. 314,610. Patented Mar. 31, 1885.
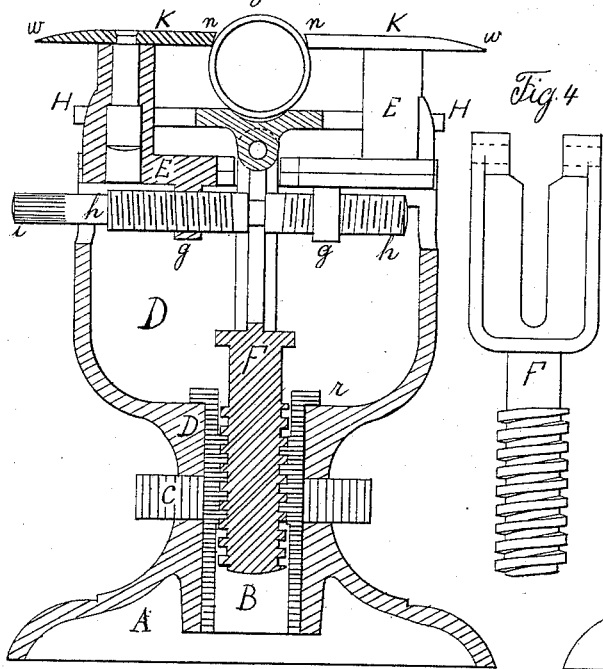
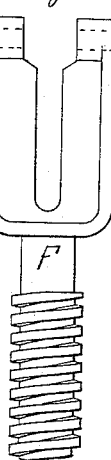
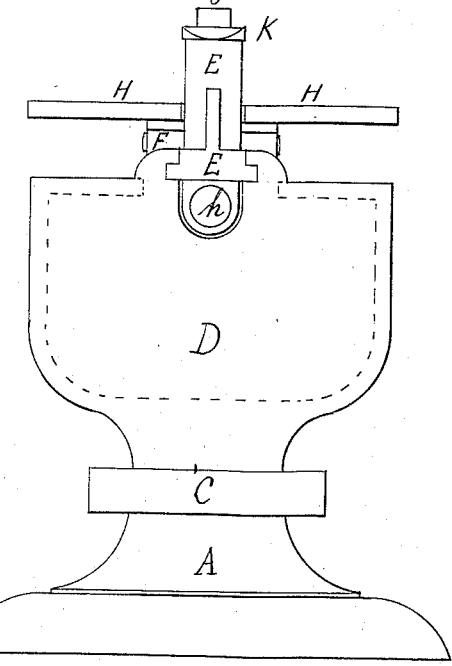
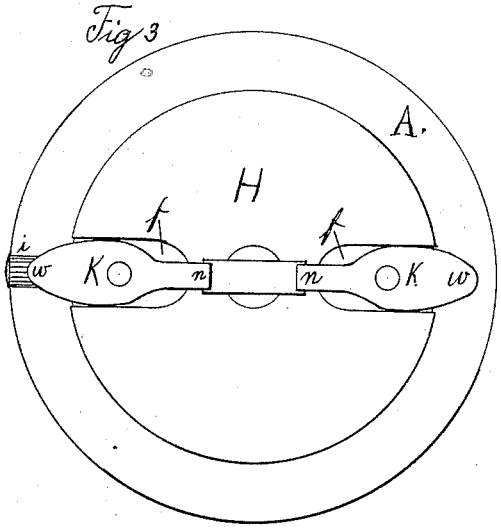
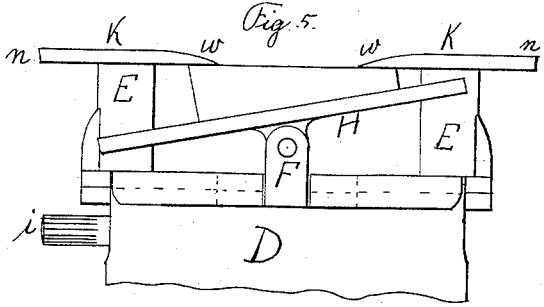
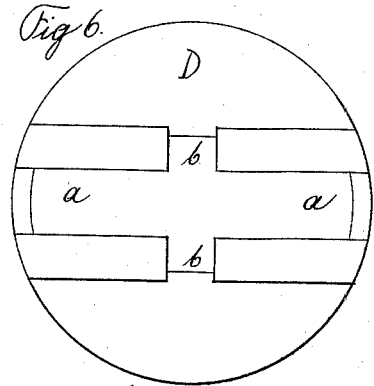
Witnesses
R. Schnaubelt
Louis E. Oehring
Inventor
Hugo Schmidt

UNITED STATES PATENT OFFICE.

HUGO SCHMIDT, OF CHICAGO, ILLINOIS.

ENGRAVER'S VISE.

SPECIFICATION forming part of Letters Patent No. 314,610, dated March 31, 1885.

Application filed October 8, 1884. (No model.)

*To all whom it may concern:*

Be it known that I, HUGO SCHMIDT, of Chicago, State of Illinois, have invented an Improvement in Engravers' Vises, of which the following is a specification.

My invention relates to a vise which is readily adjusted to hold differently-shaped articles to be engraved; and it consists, principally, in the combination of a table capable of vertical adjustment with two or more clamping-arms pivoted to jaws capable of horizontal adjustment. It also consists of the proper devices for these adjustments.

In the drawings herein referred to and forming a part of this specification, Figure 1 is a sectional, Fig. 2 a side view, and Fig. 3 a top view, of the vise. Fig. 4 is a side elevation of the screw which supports and raises and lowers the table. A side view of the upper part of the vise with the table in a tilted position to adjust itself to a taper piece is shown in Fig. 5; and Fig. 6 is a top view of the body of the vise to show the cross-slot for the horizontally-movable jaws and a rectangular opening for the above-mentioned screw which serves for raising and lowering the table.

In Figs. 1, 2, and 3 A represents the base or foot of the vise; B, a tube capable of revolving freely in a hole in the center of the base A. The inside of this tube is a screw, and the thumb-nut C is rigidly connected with it, while it is so fitted in a hole of the body D that it can revolve freely therein, but that the thumb-nut prevents it from moving upward, and the shoulder *r*, Fig. 1, from moving downward. This body D is provided with a dovetailed slot, *a a*, in which the jaws E E can move horizontally. It is also provided with another slot or opening, *b b*, for the purpose of allowing the support F to pass through. These two openings can best be seen in Fig. 6, where the support and the jaws are removed. Fig. 2 shows a side view of the opening for the jaws, but filled with the jaw E. The lower part of the support F is a screw which fits the screw of the tube B. It will thus be seen that by turning the thumb-nut C the support must be raised or lowered, as its rectangular shape where it passes through the openings *b b* prevents it from turning around. This support is shown separately in Fig. 4. Its upper part is half-round, (see Fig. 5 and dotted line, Fig. 1,) and forms a support for the table H. Besides this, the table is connected by a pin with the support. It is thus evident that the table H can be raised or lowered by turning the thumb-nut C one way or the other. Furthermore, the half-round bearing of the support and the pin connecting it to the table allow the latter to assume a tilted position, like in Fig. 5.

It now remains to be shown how the jaws E E are adjusted horizontally without interfering with the movement of the table H and its connections. The lower parts of the jaws E E have each a projection, *g g*, Fig. 1, and one of them fits the right-hand thread and the other the left-hand thread of the adjusting-screw *h h*. This screw has a knurled end at *i*, for the purpose of turning it around with the fingers. It will be seen that in this way the jaws E E can be brought close to each other or farther apart, as may be required. In the center the screw is provided with a groove, so as to fit in the long slot of the support. By this arrangement it is possible to raise and lower the support F, and with it the table H, without interfering with the relative position of the jaws E E or the adjusting-screw *h h*.

The table H is provided with two slots, *f f*. The object of this is to allow the jaws E E to be adjusted horizontally without interfering with the table.

The clamping-arms *k k* are pivoted to the posts of the jaws by a pin, as can be seen in the sectional view of the jaw E in Fig. 1.

An important feature of the clamping-arms is that they have two differently-shaped sides, a wide and thin one, *w w*, and a narrow and thick one, *n* and *n*, Figs. 1, 3, and 5. Either one of these sides can be brought to the center to bear upon the work to be held. Figs. 1 and 3 show the narrow side holding a ring, and Fig. 5 shows the wide side turned inside, holding a piece with a flat surface.

To operate the vise, it will first be necessary to determine which of the two sides of the clamping-arms offer the least obstruction to the use of the graver, and to adjust them to their proper place by swinging them on their pivot and by turning the right and left screw. Then the table must be brought low enough to allow the work to be placed under the clamping-arms, and then to raise the table again by turning the thumb-nut C. This will press the work tightly against the clamping-arms, and it is held fast ready to be engraved.

Having thus described my invention, what I claim as new, and desire to secure by Letters Patent, is—

1. The support F of an engraver's vise, provided with a vertical slot and a screw, as and for the purpose described.

2. The jaws E E of an engraver's vise, capable of horizontal adjustment, and provided with pivoted clamping-arms, in combination with the slotted table H, as and for the purpose described.

3. The jaws E E of an engraver's vise, provided with clamping-arms and capable of horizontal adjustment by means of a right-and-left screw, in combination with the table H, capable of vertical adjustment.

4. The right-and-left screw h h of an engraver's vise, in combination with the support F, provided with a slot for the purpose of allowing of vertical adjustment of this support.

HUGO SCHMIDT.

Witnesses:
THEO. STIMMING,
C. H. MIFFLIN.